(12) United States Patent
Scott

(10) Patent No.: US 8,701,526 B2
(45) Date of Patent: Apr. 22, 2014

(54) FORK CARTRIDGE DRIVER

(75) Inventor: Steven Richard Scott, Belmont, CA (US)

(73) Assignee: Motion Pro, Inc., San Carlos, CA (US)

( * ) Notice: Subject to any disclaimer, the term of this patent is extended or adjusted under 35 U.S.C. 154(b) by 259 days.

(21) Appl. No.: 13/424,545

(22) Filed: Mar. 20, 2012

(65) Prior Publication Data

US 2012/0240732 A1 Sep. 27, 2012

Related U.S. Application Data

(60) Provisional application No. 61/466,404, filed on Mar. 22, 2011.

(51) Int. Cl.
*B25B 13/48* (2006.01)
*B25B 13/02* (2006.01)
*B25B 13/06* (2006.01)
*B25B 13/00* (2006.01)
*B62K 25/06* (2006.01)

(52) U.S. Cl.
CPC ............ *B25B 13/00* (2013.01); *B25B 13/065* (2013.01); *B25B 13/48* (2013.01); *B62K 25/06* (2013.01)

USPC .......................... 81/124.6; 29/426.5

(58) Field of Classification Search
USPC ............... 81/124.2, 124.4, 125.1, 176.2, 436, 81/437, 52, 180.1; 29/402.02, 426.5
See application file for complete search history.

(56) References Cited

U.S. PATENT DOCUMENTS

| | | | |
|---|---|---|---|
| 6,276,036 B1 * | 8/2001 | Cairns | 29/235 |
| 6,339,981 B1 * | 1/2002 | Koochin | 81/437 |
| 6,418,821 B1 * | 7/2002 | Yamakawa | 81/437 |
| 2002/0011135 A1 * | 1/2002 | Hall | 81/124.4 |

* cited by examiner

*Primary Examiner* — David B Thomas
(74) *Attorney, Agent, or Firm* — Larry Guernsey; Patent Law Office of Larry Guernsey

(57) ABSTRACT

A fork cartridge driver having an outer ring and an inner driver which is reversible to engage both a fork cap and a fork cartridge. Also a second embodiment of a fork cartridge driver having an enclosed slot. Also a third embodiment of a fork cartridge driver having an engagement feature mate. Also a method for disassembling a fork cartridge assembly, which includes a fork cap having an octagonal outline portion and a fork cartridge having a ridge using a fork cartridge driver which is reversible.

18 Claims, 7 Drawing Sheets

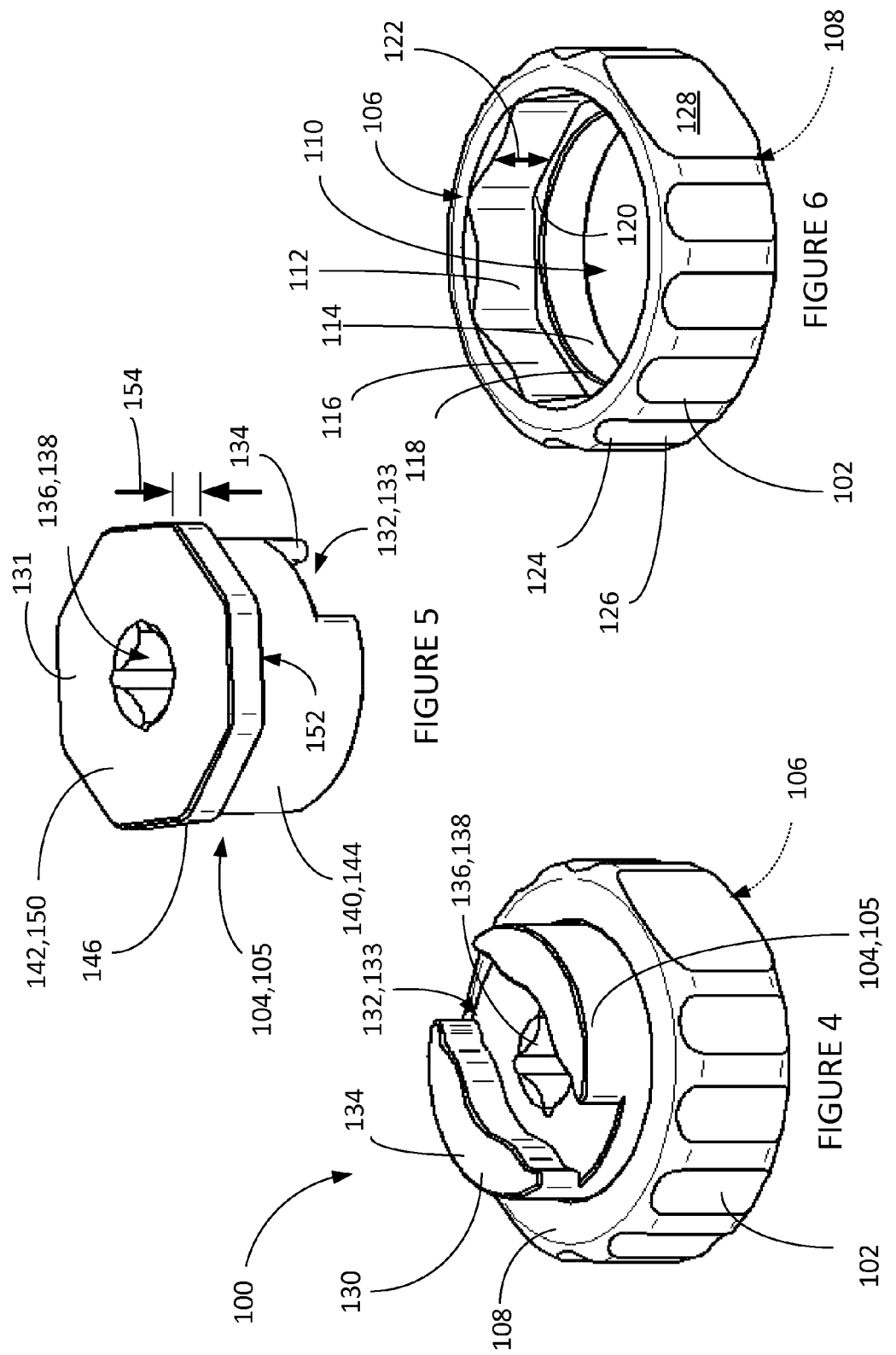

FORK CARTRIDGE DRIVER

The following non-provisional patent application claims priority to provisional application No. 61/466,404 entitled Fork Cartridge Driver to the same inventor.

TECHNICAL FIELD

The present invention relates generally to devices for repairing mechanical parts and more particularly to tools for servicing or replacing the oil in the fork of a motorcycle.

BACKGROUND ART

The front wheel of a motorcycle is usually linked to the frame by a pair of fork tubes. These tubes house the front suspension and usually include springs and compartments filled with fork oil to act as a shock absorber, which protects the rider from bumps and vibrations as the vehicle travels uneven surfaces. The most common form of fork commercially available is a telescopic fork which uses fork tubes which contain the suspension components (coil springs and damper) internally. This design is simple and inexpensive to manufacture, and relatively light compared to designs based on external components and linkage systems.

The systems that rely on using fork oil as a damper often use a fork cartridge as a means of providing regressive damping. The self-contained cartridge in a cartridge style front fork system contains spring covered orifices regulating fork oil flow. The use of the self-contained cartridge allows the fork system to be stiffer when responding to small bumps and stiffer when responding to larger bumps. This cartridge in a cartridge style front forks needs to be removed from time to time for servicing and to replenish or replaced the oil used in the fork tube and cartridge. A common configuration used on motorcycles includes a fork cartridge which is filled with oil, and this fork cartridge is then fitted within the fork tube. The fork cartridge is screwed into the inner bore of a fork cap, and then this fork cap is screwed into the bore of a fork tube. In order to remove or replace the oil, it is then a 2-stage process as the fork cap and fork cartridge are removed together from the fork tube, and then the fork cap is removed from the fork cartridge. These features are shown in FIGS. 1-3.

Modern suspension is becoming increasingly complicated both in function and servicing. The newer style forks have separated oil chambers for rebound and compression. In order to service the fork, either for modification (tuning) or for simply changing the oil, the entire fork must be disassembled. Typically, the fork will be held in a specialized vice during this process. Once the fork cap is unthreaded and removed the user must now unscrew the compression cartridge from the fork cap. Much care must be taken during this process as the parts are delicate and often are anodized. Scratching the anodizing is undesirable to the owners. Once the cap is removed, the fork cap socket (outer) is placed in a vice to prevent it from moving and the fork cartridge rotated to unscrew it from the fork cap.

FIG. 1 shows a front view of a motorcycle 1 showing the location of the fork 2 including the forks tube assemblies 3 and the wheel 4. Each fork assembly 3 includes a fork inner leg 5 and a fork outer leg 6, which are filled with oil 7. The inner leg 5 slides within the outer leg 6, and there is an oil seal 8 at the telescoping juncture of the two. The fork cartridge 22 extends within the fork tubes assemblies 3 and provides additional shock reduction. A fork cap 24 attaches to the fork cartridge 22 and then attaches in turn to the fork outer leg 6.

FIG. 2 shows a detail view of the end 20 of a fork 2 with a fork cartridge 22 inserted, and held in position by a fork cap 24 to make what will be termed a fork end assembly 26. FIG. 3 shows an exploded view of the fork end assembly 26. It will be understood that there is typically some sort of sealing ring included with the fork cap 24, but this is not shown here for sake of simplicity. The inner bore 30 of the fork end 20 is generally threaded to make a threaded inner bore 32, and the outer surface 34 of the fork cap 24 is configured with mating threads to make a threaded outer surface 36. The inner bore 38 of the fork cap 24 is also configured as a cap threaded inner bore 40, and the outer surface 42 of the fork cartridge 22 is configured with mating threads to make a cartridge threaded outer surface 44.

Thus, the fork cartridge 22 screws into the fork cap 24 and the fork cartridge 22 together with the fork cap 24, which will be termed the fork cartridge assembly 46, is then screwed into the fork end 20 to make the fork end assembly 26.

To aid in turning the fork cartridge assembly 46 with respect to the fork end 20, or the fork cap 24 with respect to the fork cartridge 22, the fork cap 24 is provided with an octagonal outline 48, which can be engaged with a wrench. The fork cartridge 22 is also configured with a flanged top 50, with a ridge 52, which can be gripped to turn the fork cartridge 22 with respect to the fork cap 24.

The removal of the fork cartridge 22 is thus performed in two stages. First, the fork cartridge assembly 46, which includes the fork cartridge 22 and fork cap 24, is unscrewed from the fork end assembly 26, as the fork 2 is held in a vise, or otherwise restrained from turning. Second, the fork cartridge 22 is unscrewed from the fork cap 24, as the fork cap 24 is held in a vise. Thus, for the first stage, a wrench of appropriate size and configuration is used to grip the octagonal outline 48 of the fork cap 24. Then, in the second stage, a tool must be found to grip the ridge 52 of the fork cartridge 22. Motorcycle repair shops commonly use sets of socket wrenches with a ratchet handle for mechanical operations, but the ridge on the top of the fork cartridge generally requires a different tool, which may require some effort to locate, thus wasting time. It would be much more efficient if a single tool adapted for both operations could be used that allow easy manipulating of both stages of removal.

There is an existing tool on the market that is designed for removing a fork cartridge, and is generally configured as a one piece long box wrench made from 2 mm thick aluminum or steel that fits the fork cap. This existing tool also has a rectangular slot in the handle portion that is designed to fit over the fork cartridge ridge 52. However, in order to use this tool to remove the fork cartridge 22 from the fork cap 24, it requires either the use of two of these tools, one to hold the fork cap 24 by the hex outer shape 48 and another to grip the ridge 52 on the fork cartridge or, using only one of these tools, by clamping the fork cap cartridge hex 48 in a vise and then using the rectangular slot feature on the existing tool to grip and turn the ridge 52 on the fork cartridge 22.

However, there are several problems with using the existing tool as described above: 1) the ridge 52 on the fork cartridge rises only about 2 mm above the height of the top of the fork cap when assembled and thus provides a very limited purchase for attachment of the existing tool to the ridge 52. 2) when used with the fork cap octagonal outline 48 clamped in a vise to hold it, the octagonal outline 48 part of the fork cap 24 must be very carefully positioned so that the top of the fork cap is flush with the top of the vice and allows the slot on the existing tool to get maximum possible purchase on the ridge 52 of the fork cartridge 22. This is difficult and time consuming to do, and often ends in frustration and damage to the fork cap and or the fork cartridge.

The manufacturer of the fork recommends using a 36 mm socket to grip and turn the ridge 52 on the fork cartridge while the fork cap octagonal outline 48 is clamped in a vice. This method allows more leeway in clamping the fork cap octagonal outline 48 because the top of the fork cap 24 can be below the top of the vice and the socket (if long enough) can still get full purchase along almost the entire height of the fork cartridge ridge 52. However, the problem with this method is that the elongated hexagonal shape of the ridge 52 only allows the socket wrench to engage two of the points in the socket, with very limited contact area and does not provide a very secure grip on the fork cartridge ridge 52 (a hex socket normally engages six flats on a hex head to provide many more times the contact area).

If the tool slips as torque is applied, this could easily result in damage to the fork cartridge, which once damaged cannot be repaired. The manufacturer does not offer replacement fork caps or cartridges separately and requires that the entire assembly be purchased together at a cost of several hundred dollars.

Thus, there is a need for a fork cartridge driver which provides a single tool which can be adapted to both stages of the removal process and which is usable to engage both the fork cartridge and the fork cap.

There is further a need for a tool that provides a much better and secure grip on the parts that are being disassembled and reassembled and thereby greatly reduces the likelihood of damage to those parts that are very expensive to replace.

DISCLOSURE OF INVENTION

Briefly, one preferred embodiment of the present invention is a fork cartridge driver having an outer ring and an inner driver, which is reversible to engage both a fork cap and a fork cartridge. Also disclosed is a second embodiment of a fork cartridge driver having an enclosed slot. Also disclosed is a third embodiment of a fork cartridge driver having an engagement feature mate. Also disclosed is a method for disassembling a fork cartridge assembly, which includes a fork cap having an octagonal outline portion and a fork cartridge having a ridge using a fork cartridge driver which is reversible.

An advantage of the present invention is that it presents a fork cartridge driver with a reversible inner driver, which can engage and manipulate both the fork cartridge and the fork cap.

Another advantage of the present invention is that the present invention presents a single tool for the two-step removal operation, whereas previously two or more separate tools were required.

And another advantage of the present invention is that it includes an outer ring which can engage the fork cap while the inner driver can engage the fork cartridge.

A further advantage of the present invention is that when the outer ring has engaged the fork cap, the outer ring itself can be clamped instead of the fork cartridge, thus preserving its finish from marring or denting.

A yet further advantage of the present invention is that the outer ring has a knurled surface for easier gripping, and a flat surface area which makes clamping in a vice more secure.

Another advantage of the present invention is that the mating of the tool with the parts is very secure and may reduce slipping of the tool and thus reduces potential damage to the parts.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIGS. 4-6 show isometric views of the elements of the cartridge driver of the present invention;

DETAILED DESCRIPTION OF THE PREFERRED EMBODIMENTS

The present invention is a fork cartridge driver, which will be referred to by the reference number 100, and thus shall be referred to as cartridge driver 100. A preferred embodiment of the cartridge driver 100 is illustrated in FIGS. 4-10.

Figures 2, 3:
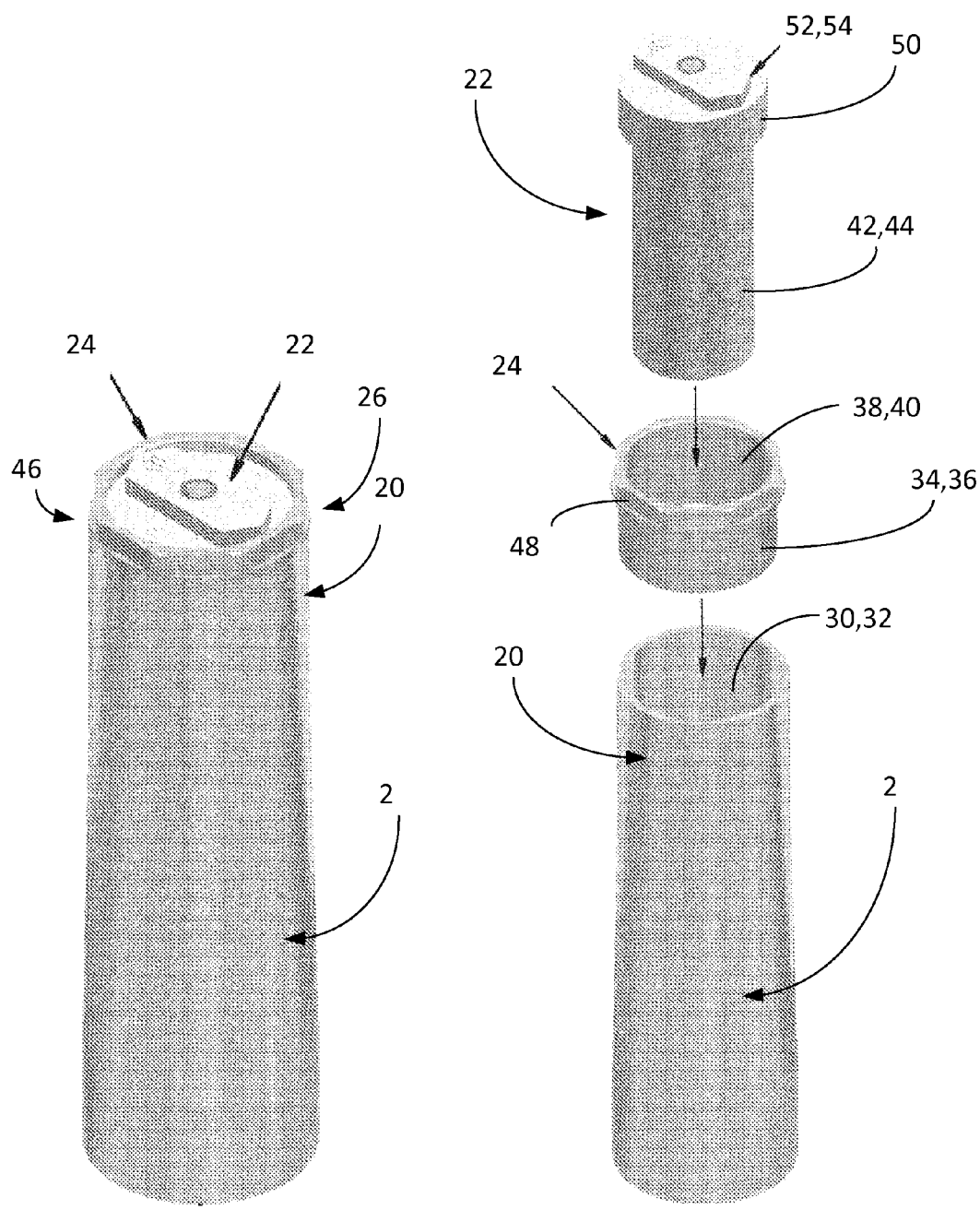
FIG. 2 shows an isometric view of the end of a fork end assembly showing the fork cartridge and cap.
FIG. 3 shows an exploded isometric view of a fork end assembly.
Figures 7, 8:
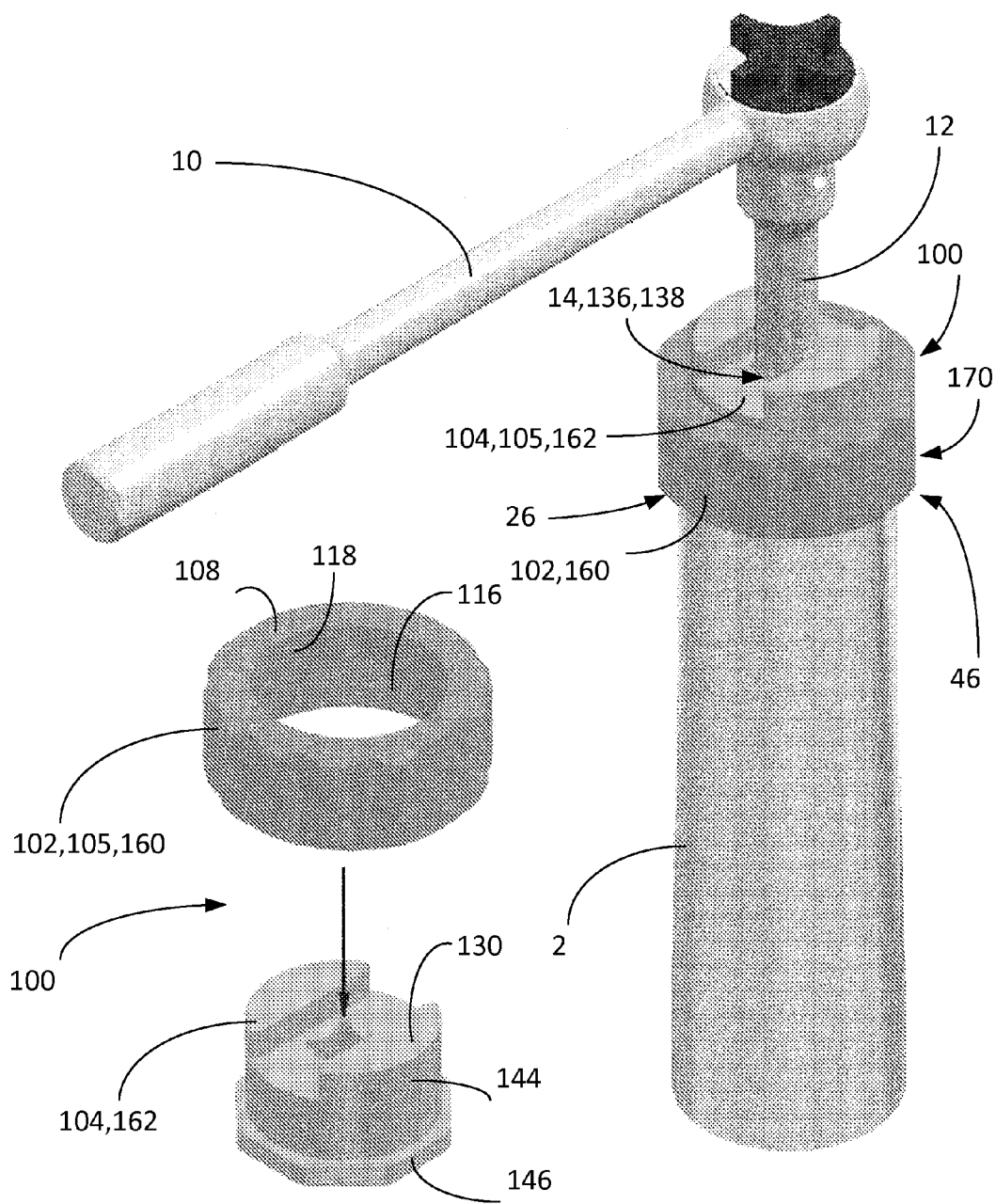
FIG. 7 shows an exploded isometric top view of the cartridge driver of the present invention in upright position.
FIG. 8 shows an isometric top view of the cartridge driver of the present invention in position on a fork end assembly.

Modern motorcycle suspensions are becoming increasingly complicated both in function and servicing. The newer style forks have separated oil chambers for rebound and compression. A common configuration used on motorcycles includes a fork cartridge which is filled with oil, and this fork cartridge is then fitted within the fork tube as seen in FIG. 2. The fork cartridge is screwed into the inner bore of a fork cap, and then this fork cap is screwed into the bore of a fork tube. In order to remove or replace the oil, it is then a 2-stage process as the fork cap and fork cartridge are removed together from the fork tube, and then the fork cap is removed from the fork cartridge.

Figure 1:
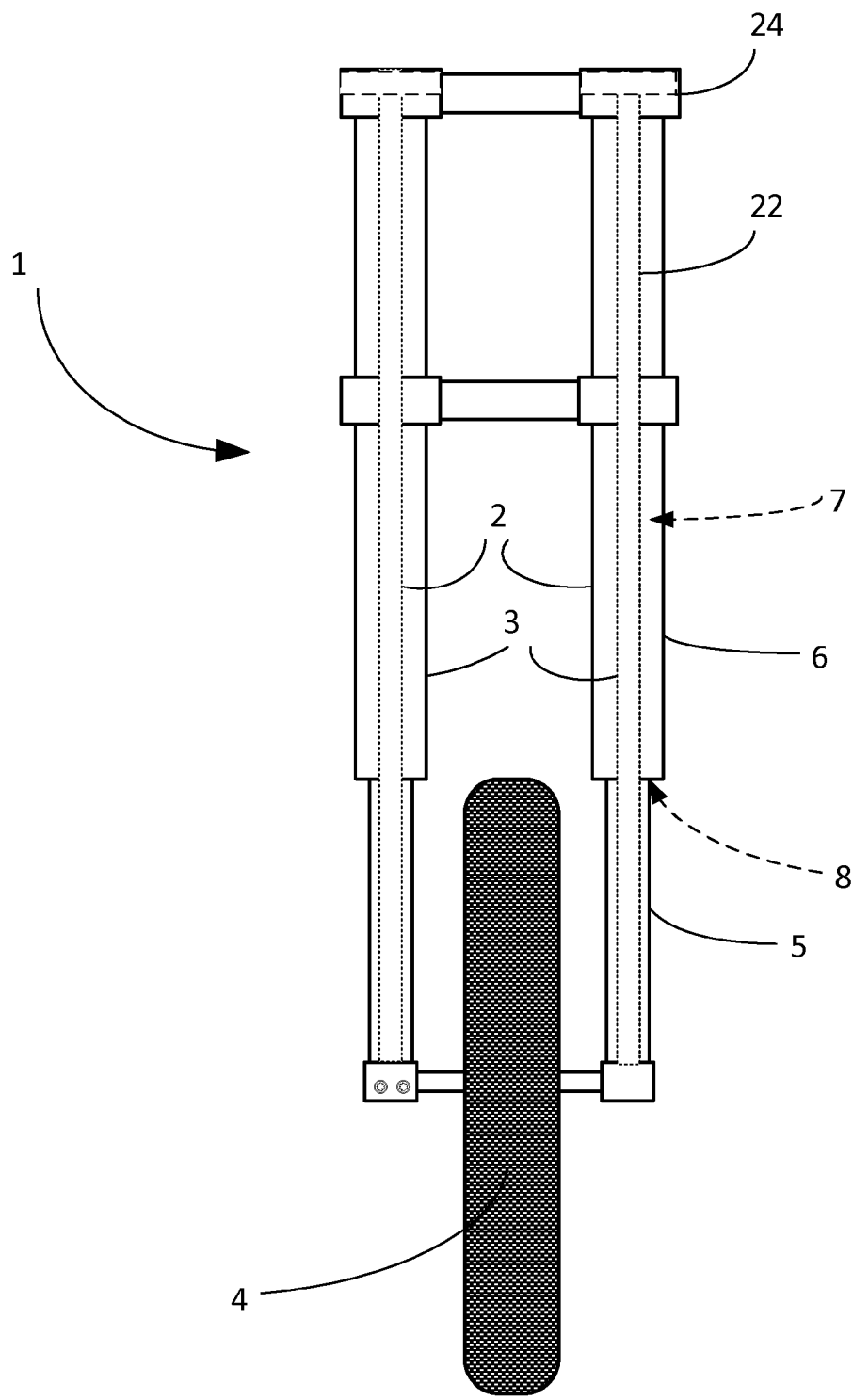
FIG. 1 shows a front elevation view of the front of a motorcycle including the forks and wheel.

FIG. 1 shows a front view of a motorcycle 1 showing the location of the fork 2 including the forks tube assemblies 3 and the wheel 4. Each fork assembly 3 includes a fork inner leg 5 and a fork outer leg 6, which are filled with oil 7. The inner leg 5 slides within the outer leg 6, and there is an oil seal 8 at the telescoping juncture of the two. The fork cartridge 22 extends within the fork outer leg 6 and provides additional shock reduction. A fork cap 24 attaches to the fork cartridge and then attaches in turn to the fork outer leg 6

FIG. 2 shows a detail view of the end 20 of a fork 2 with a fork cartridge 22 inserted, and held in position by a fork cap 24 to make what will be termed a fork end assembly 26. FIG. 3 shows an exploded view of the fork end assembly 26. It will be understood that there is typically some sort of sealing ring included with the fork cap 24, but this is not shown here for sake of simplicity. The inner bore 30 of the fork end 20 is generally threaded to make a threaded inner bore 32, and the outer surface 34 of the fork cap 24 is configured with mating threads to make a threaded outer surface 36. The inner bore 38 of the fork cap 24 is also configured as a cap threaded inner bore 40, and the outer surface 42 of the fork cartridge 22 is configured with mating threads to make a cartridge threaded outer surface 44.

Thus, the fork cartridge 22 screws into the fork cap 24 and the fork cartridge 22 together with the fork cap 24, which will be termed the fork cartridge assembly 46, is then screwed into the fork end 20.

To aid in turning the fork cartridge assembly 46 with respect to the fork end 20, or the fork cap 24 with respect to the fork cartridge 22, the fork cap 24 is provided with an octagonal outline 48, which can engage with a wrench. The fork cartridge 22 is also configured with a flanged top 50, with a ridge 52, which can be gripped to turn the fork cartridge 22 with respect to the fork cap 24.

The removal of the fork cartridge 22 is thus performed in two stages. First, the fork cartridge assembly 46, which includes the fork cartridge 22 and fork cap 24, is unscrewed from the fork end assembly 26, as the fork 2 is held in a vise, or otherwise restrained from turning. Second, the fork cartridge 22 is unscrewed from the fork cap 24, as the fork cap 24 is held in a vise. Thus, for the first stage, a wrench of appropriate size and configuration is used to grip the octagonal outline 48 of the fork cap 24. Then, in the second stage, a tool must be found to grip the engagement feature 54, which is configured as a ridge 52 of the fork cartridge 22. Motorcycle repair shops commonly use sets of socket wrenches with a ratchet handle for mechanical operations, but the ridge on the top of the fork cartridge generally requires a different tool, which may require some hunting to locate, thus wasting time. It would be much more efficient if a single adaptor tool could be used that allow easy manipulating of both stages of removal.

The present cartridge driver 100 is shown in FIGS. 4-10. The cartridge driver 100 includes an outer ring 102 and an inner driver 104, which is a reversible driver 105. The outer ring 102 is shown by itself in FIG. 6, where the bottom surface 106 has been turned upright. The top surface 108 is seen in FIG. 4. References in this discussion to "upper" or "lower" will assume that these refer to portions when the top surface 108 is uppermost, as seen in FIG. 4.

Referring now specifically to FIG. 6, the outer ring 102 has a central bore 110 having a larger lower bore 112 and a smaller upper bore 114. This interior of the larger bottom bore 112 has an internal octagonal outline 116, which mates with the octagonal outline 48 of the fork cap 24 (see FIG. 3). The smaller upper bore 114 is preferably a cylindrical bore 118. There is an internal step 120 where the larger lower bore 112 reduces internal diameter to the smaller upper bore 114. There is a depth dimension of the lower bore 112 between the bottom surface 106 and the internal step 120, which will be referred to as the lower portion depth 122.

The outer surface 124 of the outer ring 102 preferably has a knurled surface 126, which further preferably includes flat surface areas 128. The knurled surface 126 and the flat surface areas 128 both provide excellent purchase for gripping the outer ring 102 with fingers or tools.

The inner driver 104 also has a top surface 130, seen in FIG. 4, and a bottom surface 131, seen in FIG. 5. The top surface 130 includes an engagement feature mate, in this case a slot 132, which is surrounded by ridges 134, and an insertion opening 136, formed between the ridges 134. The insertion hole 136 is preferably a square hole 138, to mate with the presently favored tool having a square end, but the driver 100 could be manufactured with various other shaped holes to accommodate tools of other configurations.

The inner driver 104 is also preferably configured with a smaller upper portion 140 and a larger lower portion 142, best seen in FIG. 5. The smaller upper portion 140 has a cylindrical outer shape 144, which is configured to fit within the cylindrical bore 118 of the outer ring 102. The larger upper portion 142 includes an octagonal outline 146, which matches with the octagonal outline 48 of the fork cap 24, and also mates with the internal octagonal profile 116 of the outer ring 102.

The larger lower portion 142 forms a plate 150, which has the bottom surface 131 on one side, and portions of a step surface 152 where the smaller diameter upper portion 140 meets the larger diameter lower portion 142. The distance between these two surfaces 131 and 152 is the thickness 154 of the plate 150. This thickness 154 is smaller than the lower portion depth 122 of the outer ring 102.

The cartridge driver 100 is shown in use in FIGS. 7-10. In the first stage of the removal process, the fork cartridge assembly 46, which includes the fork cartridge 22 and fork cap 24, is unscrewed from the fork end assembly 26, as the fork 2 is held in a vise. The cartridge driver 100 is first assembled with the outer ring 102 positioned with the top surface 108 facing upwards. This position will be referred to as the upright position 160 of the outer ring 102. The inner driver 104 is also turned with its top surface 130 facing upwards, defining the upright position 162 of the inner driver 104. The outer ring 102 then is placed over the inner driver 104 so that the cylindrical portion 144 of the inner driver 104 fits through the cylindrical bore 118 of the outer ring 102, and the octagonal outline 144 of the inner driver 104 mates with the octagonal inner outline 116 of the outer ring 102. The inner driver 104 in upright position 162 and the outer ring 102 in upright position 160 are thus fitted together to form the tool's composite upright position assembly 170. This upright position assembly 170 is then placed over the fork end assembly 26.

The cartridge driver 100 then seats on the fork cartridge 22, and as the thickness 154 of the plate 150 of the inner driver 104 is less than the lower portion depth 122 of the outer ring 102, the inner driver 104 is pressed upwards through the outer ring 102 until the step surface 152 of the inner driver 104 hits the internal step 120 of the outer ring 102. The remainder of the lower bore 112 of the outer ring 102 having the internal octagonal outline 116 then engages the octagonal outline 48 of the fork cap 24.

A hand tool 10, currently favored to be a ratchet wrench with an extension 12 having a square tip 14 is engaged with the insertion hole 136, which is a square hole 138. It is to be understood that other configurations of tool tip, i.e. Hexagonal, triangular, etc. could be accommodated by providing an inner driver with an insertion hole of matching configuration. There may be a set of inner drivers which are interchangeable with different insertion hole configurations and hole sizes, all of which are sized to fit with the same outer ring. These may be sized or configured to fit tools of various international conventions, i.e. Metric, English, etc.

The hand tool 10 is then turned, and as the inner driver 104 is made to rotate, the outer ring 102 rotates and the fork cap 24 is made to rotate. When the fork cap 24 has been unscrewed from the tube end 20, the fork cartridge assembly 46 can then be removed, and the upright position assembly 170 of the cartridge driver 100 is removed from the cartridge assembly.

Figures 9, 10:
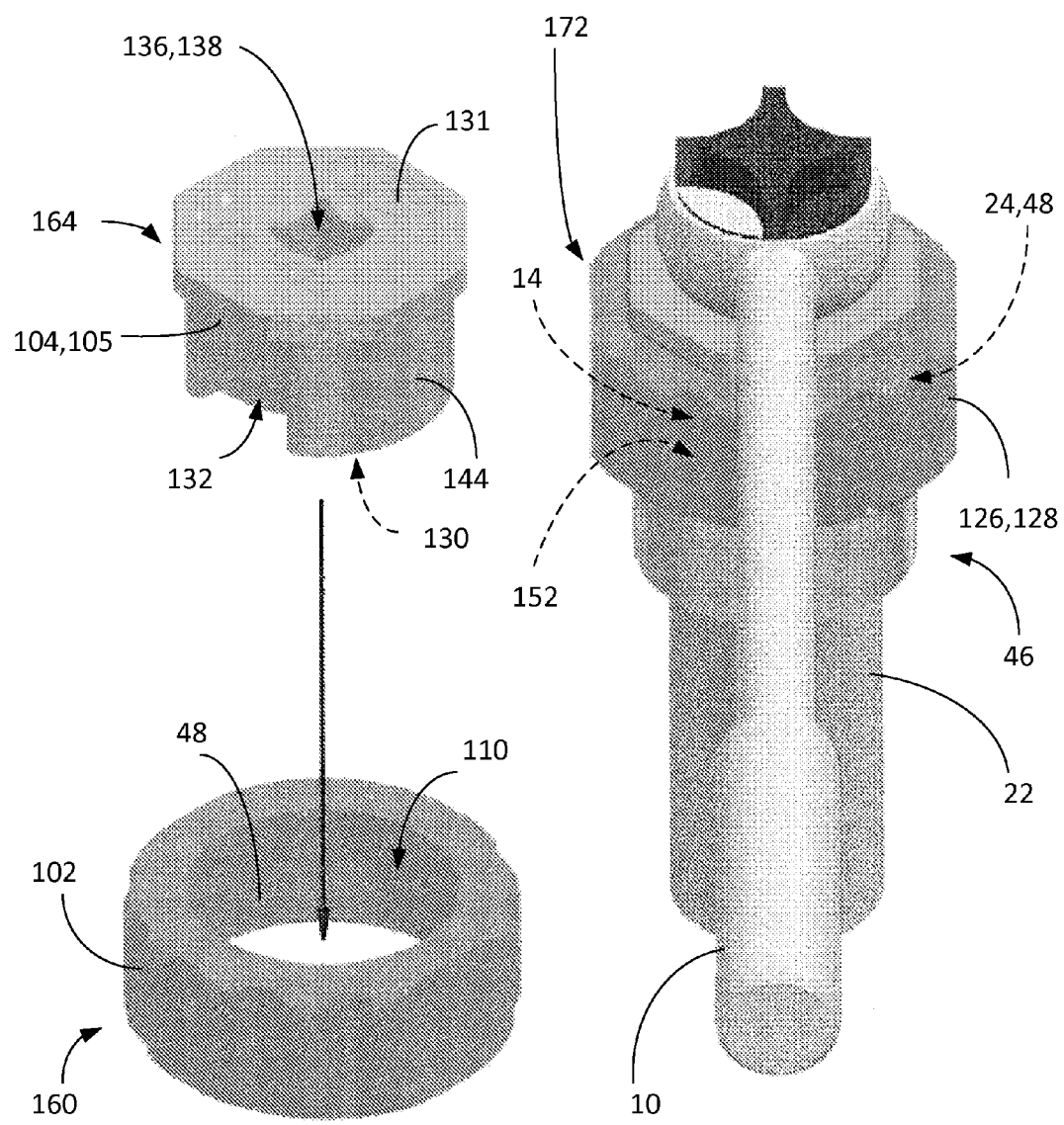
FIG. 9 shows an exploded isometric view of the cartridge driver in reverse position.
FIG. 10 is an isometric view of the cartridge driver in reverse position in use on a fork cartridge assembly.

Next, the fork cap 24 is unscrewed from the fork cartridge 22. FIGS. 9-10 shows the cartridge driver 100 re-configured for this second stage operation. The outer ring 102 remains in upright position 160, and is placed in position on the fork cartridge assembly 46 so that the internal octagonal outline 116 again engages with the octagonal outline 48 of the fork cap 24 (see FIGS. 6 and 3).

The inner driver 104, which is a reversible driver 105, is then inverted so that the top surface 130 is on the bottom, and the bottom surface 131 is on top. The inner driver 104 is thus in inverted position 164, and the cylindrical portion 144 of the inner driver 104 is inserted into the central bore 110 of the outer ring 102, until the slot 132 of the inner driver 104 mates with the engagement feature 54, in this case a ridge 52 of the fork cartridge 22. The square tip 14 of the hand tool 10 is again inserted into the square insertion hole 136,138, and the handle turned so that the fork cap 24 is held steady by the outer ring 102, and the fork cartridge 22 is turned in relation to the fork cap 24, thus unscrewing it.

The outer ring 102 can be clamped in a vice to hold the fork cap 24 steady, and this provides an advantage, as the vice does not contact the fork cartridge 22. It is thus protected from damage such as scratching or denting. Since some of the fork cartridges are anodized, it may be important to the owner that these parts remain unmarred. The knurled surface 126 and flat surface area 128 of the outer ring 102 are especially useful for providing a surface for being clamped securely by jaws of a vice, and is another advantage of the present invention.

Additionally, it is presently preferred that the outer ring 102 and inner driver 104 of the cartridge driver 100 be made of aluminum or non-marring plastic of appropriate strength, which thus minimize the chances of scarring the fork cartridge 22 or fork cap 24. However, this is not to be construed as a limitation and other materials of appropriate strength can be used.

There are several potential problems when performing a replacement or repair of the fork cartridge. 1) the ridge 52 on the fork cartridge 22 rises only about 2 mm above the height of the top of the fork cap 24 when assembled and thus provides a very limited purchase for attachment of the existing tool to the ridge 52. 2) when used with the fork cap octagonal outline 48 clamped in a vice to hold it, the octagonal outline 48 must be very carefully positioned so that the top of the fork cap 24 is flush with the top of the vice and allows the slot on the existing tool to get maximum possible purchase on the ridge 52 of the fork cartridge. This is difficult and time consuming to do, and often ends in frustration and damage to the fork cap and or the fork cartridge.

The manufacturer of the fork recommends using a 36 mm socket to grip and turn the ridge 52 on the fork cartridge 22 while the fork cap octagonal outline 48 is clamped in a vice. This method allows more leeway in clamping the octagonal outline 48 because the top of the fork cap can be below the top of the vice and the socket (if long enough) can still get full purchase along almost the entire height of the fork cartridge ridge 52, but the problem with this method is that the elongated hexagonal shape of the ridge 52 only allows the socket wrench to engage two of the points in the socket with very limited contact area and does not provide a very secure grip on the fork cartridge ridge 52 (a hex socket normally engages six flats on a hex head thus providing many more times the contact area). If the tool slips as torque is applied, this could easily result in damage to the fork cartridge, which once damaged cannot be repaired. The manufacturer does not offer replacement fork caps or cartridges separately and requires that the entire assembly be purchased together at a cost of several hundred dollars.

The present cartridge driver 100 is able to grip the ridge 52 along almost its full height and thus has a much more secure grip and is less likely to damage the fork cartridge and is much easier to operate because there is less opportunity for it to slip off.

Thus, the present invention 100 offers a substantial improvement because it provides a much better and secure grip on the parts that are being disassembled and reassembled and thereby greatly reduces the likelihood of damage to those parts, which are very expensive to replace.

Figure 13:
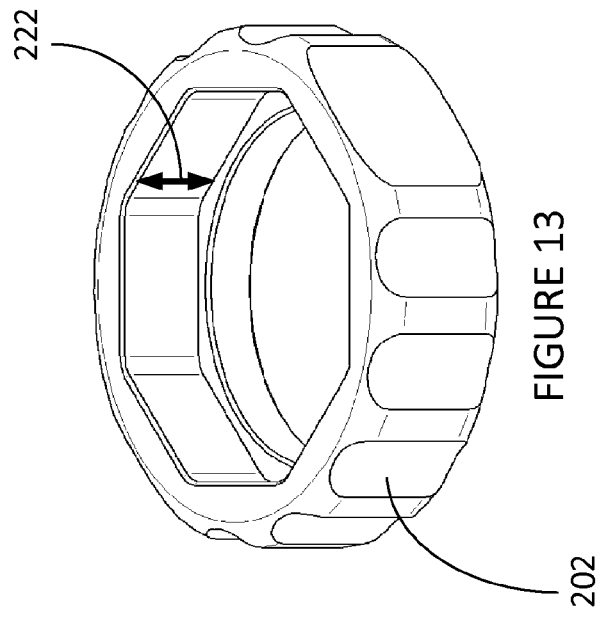
FIGS. 11-13 show isometric views of the elements of the second embodiment cartridge driver of the present invention.
Figure 12:
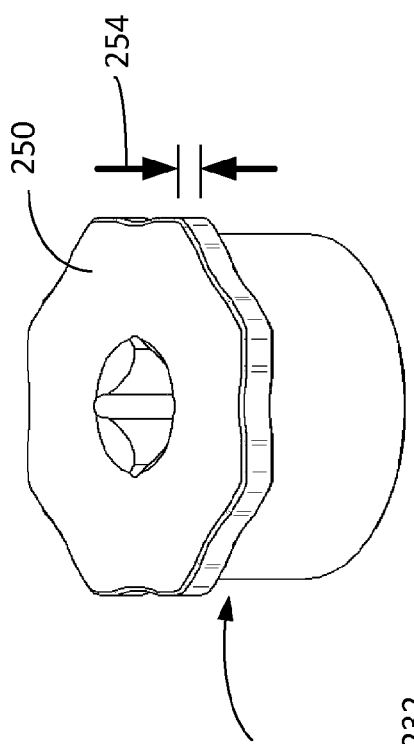
Figure 11:
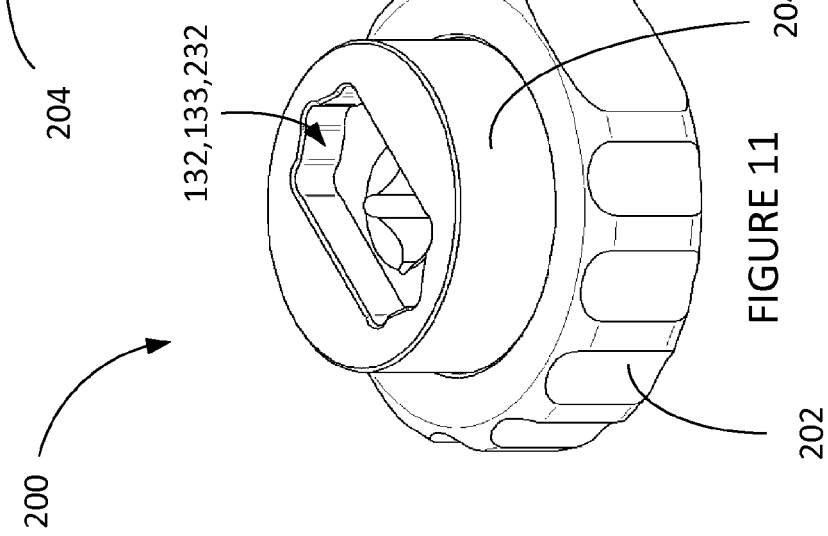

A second embodiment is shown in FIGS. 11-13. This second embodiment of the fork cartridge driver will be designated by the reference number 200. Where elements are similar to the earlier embodiment, the same numbers will be used or possibly used with the leading digit to be a "2" instead of a "1". Thus FIG. 11 shows the entire fork cartridge driver 200, FIG. 12 shows the inner driver 204 and FIG. 13 shows the outer ring 202.

As shown in FIG. 11, the inner driver 204 is configured much like the first embodiment 100 discussed earlier, and functions in a similar manner. One significant difference is that the ends of the slot 132 have been enclosed to make an enclosed slot 232. Also, the lower portion depth 222 of the outer ring 202 has been increased, and the thickness 254 of the plate 150 of the inner driver 204 has been decreased to provide better grip on the fork cap.

This second embodiment 200 functions almost identically with the first embodiment 100, and is one of many possible examples of how variations can be made in the present invention while still falling within the scope of the invention.

Figure 15:
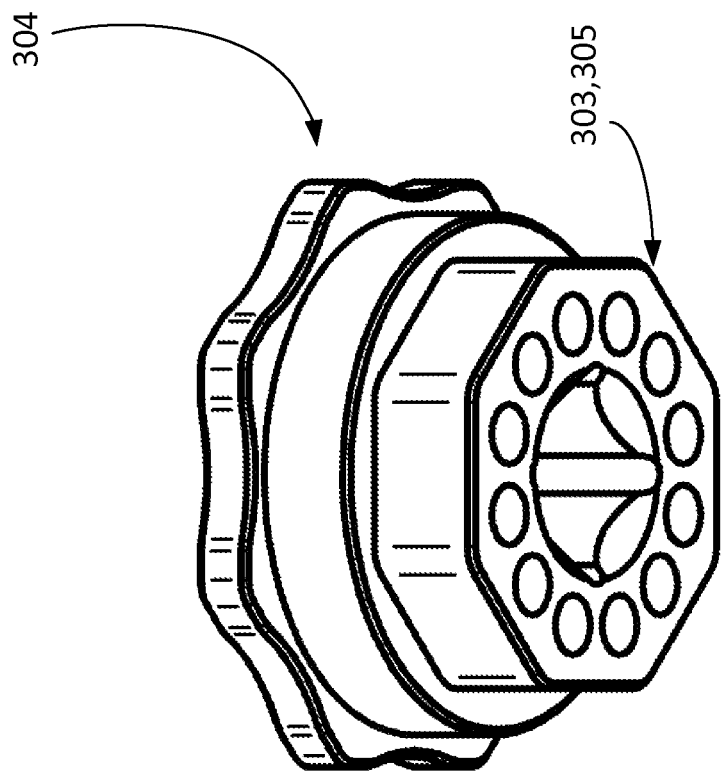
FIGS. 14-15 show isometric views of the elements of the third embodiment cartridge driver of the present invention
Figure 14:
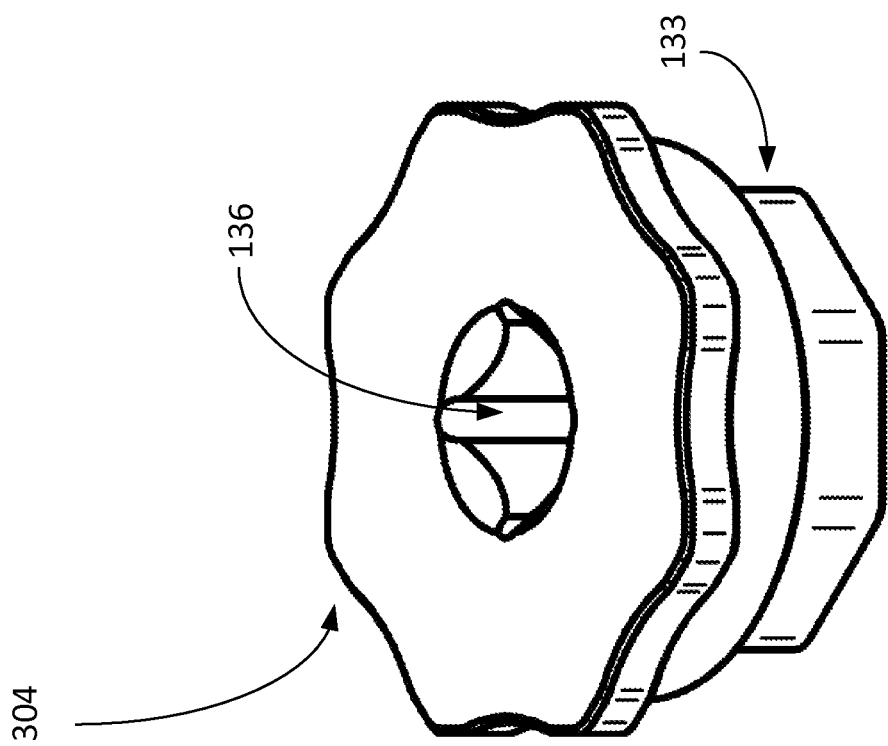

A third embodiment is shown in FIGS. 14-15. This third embodiment of the inner driver of the fork cartridge driver will be designated by the reference number 304. Presently fork cartridges are being manufactured with a variety of engagement features which the inner driver of the fork cartridge tool must engage. In the first two embodiments, this engagement feature 54 was a protruding ridge 52 for which the engagement feature mate 133 of the inner driver 104 was configured as a slot 132 in the first embodiment (see FIG. 4) or as an enclosed slot 232 in the second embodiment (see FIG. 11). There are a variety of other fork cartridge engagement features on the market now which include other configurations of protruding male features, but also may include intruding, female, features such as variously configured holes. In the third embodiment, inner driver 304 includes an engagement feature mate configured as a raised portion 303, which is configured as an octagonal protrusion 305, which thus mates with a corresponding engagement feature configured as an octagonal recess in the fork cartridge (not shown). In a similar way to the operation conducted by the first and second embodiments, the third embodiment mates with the engagement feature of the fork cartridge, and when a turning tool is engaged with the insertion hole 336 of the inner driver 304 and turned, the inner driver 304, and the fork cartridge turn together relative to the fork cap, which is held still by the outer ring as before.

Other configurations of engagement features are known which include a series of holes in the top of the fork cartridge in a square pattern, which are mirrored by a square pattern of mating pins in the inner driver.

There are of course a great variety of possible engagement features that can be configured, and it seems to be a trend that manufacturers favor their own unique configuration, rather than utilizing a standardized configuration. However, a great variety in configurations in the inner driver mating portion to mate with these various engagement features is expected, and all are contemplated as being within the course and scope of the present invention.

While various embodiments have been described above, it should be understood that they have been presented by way of example only, and not limitation.

INDUSTRIAL APPLICABILITY

The present fork cartridge driver 100 is well suited generally for use in replacing or repairing fork cartridges in fork tube assemblies of motorcycles.

This fork cartridge driver 100 includes an outer ring 102 which has a central bore 110 having a larger lower bore 112 and a smaller upper bore 114. This interior of the larger bottom bore 112 has an internal octagonal outline 116, which mates with the octagonal outline 48 of the fork cap 24. The smaller upper bore 114 is preferably a cylindrical bore 118. There is an internal step 120 where the larger lower bore 112 reduces internal diameter to the smaller upper bore 114. There is a depth dimension of the lower bore 112 between the bottom surface 106 and the internal step 120, which will be referred to as the lower portion depth 122.

The outer surface 124 of the outer ring 102 preferably has a knurled surface 126, which further preferably includes flat surface areas 128. The knurled surface 126 and the flat surface areas 128 both provide excellent purchase for gripping the outer ring 102 with fingers or tools.

The inner driver 104 also has a top surface 130, and a bottom surface 131. The top surface 130 includes a slot 132, which is surrounded by ridges 134, and an insertion opening 136, formed between the ridges 134. The insertion hole 136 is preferably a square hole 138, to mate with the presently favored tool having a square end, but the driver 100 could be manufactured with various other shaped holes to accommodate tools of other configurations.

The inner driver 104 is also preferably configured with a smaller upper portion 140 and a larger lower portion 142. The smaller upper portion 140 has a cylindrical outer shape 144, which is configured to fit within the cylindrical bore 118 of the outer ring 102. The larger upper portion 142 includes an octagonal outline 146, which matches with the octagonal outline 48 of the fork cap 24, and also mates with the internal octagonal profile 116 of the outer ring 102.

The larger lower portion 142 forms a plate 150, which has the bottom surface 131 on one side, and portions of a step surface 152 where the smaller diameter upper portion 140 meets the larger diameter lower portion 142. The distance between these two surfaces 131 and 152 is the thickness 154 of the plate 150. This thickness 154 is smaller than the lower portion depth 122 of the outer ring 102.

In the first stage of the removal process, the fork cartridge assembly 46, which includes the fork cartridge 22 and fork cap 24, is unscrewed from the fork end assembly 26, as the fork 2 is held in a vise. The cartridge driver 100 is first assembled with the outer ring 102 positioned with the top surface 108 facing upwards. This position will be referred to as the upright position 160 of the outer ring 102. The inner driver 104 is also turned with its top surface 130 facing upwards, defining the upright position 162 of the inner driver 104. The outer ring 102 then is placed over the inner driver 104 so that the cylindrical porton 144 of the inner driver 104 fits through the cylindrical bore 118 of the outer ring 102, and the octagonal outline 144 of the inner driver 104 mates with the octagonal inner outline 116 of the outer ring 102. The inner driver 104 in upright position 162 and the outer ring 102 in upright position 160 are thus fitted together to form the tool's composite upright position assembly 170. This upright position assembly 170 is then placed over the fork end assembly 26.

The cartridge driver 100 then seats on the fork cartridge 22, and as the thickness 154 of the plate 150 of the inner driver 104 is less than the lower portion depth 122 of the outer ring 102, the inner driver 104 is pressed upwards through the outer ring 102 until the step surface 152 of the inner driver 104 hits the internal step 120 of the outer ring 102. The remainder of the lower bore 112 of the outer ring 102 having the internal octagonal outline 116 then engages the octagonal outline 48 of the fork cap 24.

A hand tool 10, currently favored to be a ratchet wrench with an extension 12 having a square tip 14, is engaged with the insertion hole 136, which is a square hole 138. It is to be understood that other configurations of tool tip, i.e. hexagonal, triangular etc. could be accommodated by providing an inner driver with an insertion hole of matching configuration. There may be a set of inner drivers which are interchangeable with different insertion hole configurations and hole sizes, all of which are sized to fit with the same outer ring. These may be sized or configured to fit tools of various international conventions, i.e. Metric, English, etc.

The hand tool 10 is then turned, and as the inner driver 104 is made to rotate, the outer ring 102 rotates and the fork cap 24 is made to rotate. When the fork cap 24 has been unscrewed from the tube end 20, the fork cartridge assembly 46 can then be removed, and the upright position assembly 170 of the cartridge driver 100 is removed from the cartridge assembly.

Next, the fork cap 24 is unscrewed from the fork cartridge 22. FIGS. 9-10 shows the cartridge driver 100 re-configured for this second stage operation. The outer ring 102 remains in upright position 160, and is placed in position on the fork cartridge assembly 46 so that the internal octagonal outline 116 again engages with the octagonal outline 48 of the fork cap 24.

The inner driver 104, which is a reversible driver 105, is then inverted so that the top surface 130 is on the bottom, and the bottom surface 131 is on top. The inner driver 104 is thus in inverted position 164, and the cylindrical portion 144 of the inner driver 104 is inserted into the central bore 110 of the outer ring 102, until the slot 132 of the inner driver 104 mates with the ridge 52 of the fork cartridge 22. The square tip 14 of the hand tool 10 is again inserted into the square insertion hole 136,138, and the handle turned so that the fork cap 24 is held steady by the outer ring 102, and the fork cartridge 22 is turned in relation to the fork cap 24, thus unscrewing it.

The outer ring 102 can be clamped in a vice to hold the fork cap 24 steady, and this provides an advantage, as the vice does not contact the fork cartridge 22. It is thus protected from damage such as scratching or denting. Since some of the fork cartridges are anodized, it may be important to the owner that these parts remain unmarred. The knurled surface 126 and flat surface area 128 of the outer ring 102 are especially useful for providing a surface for being clamped securely by jaws of a vice, and is another advantage of the present invention.

Additionally, it is presently preferred that the outer ring 102 and inner driver 104 of the cartridge driver 100 be made of aluminum or non-marring plastic of appropriate strength, which thus minimize the chances of scarring the fork cartridge 22 or fork cap 24. However, this is not to be construed as a limitation and other materials of appropriate strength can be used.

There are several potential problems when performing a replacement or repair of the fork cartridge. 1) The ridge 52 on the fork cartridge 22 rises only about 2 mm above the height of the top of the fork cap 24 when assembled and thus provides a very limited purchase for attachment of the existing tool to the ridge 52. 2) when used with the fork cap octagonal outline 48 clamped in a vise to hold it, the octagonal outline 48 must be very carefully positioned so that the top of the fork cap 24 is flush with the top of the vice and allows the slot on the existing tool to get maximum possible purchase on the ridge 52 of the fork cartridge. This is difficult and time consuming to do, and often ends in frustration and damage to the fork cap and or the fork cartridge.

The manufacturer of the fork recommends using a 36 mm socket to grip and turn the ridge 52 on the fork cartridge 22 while the fork cap octagonal outline 48 is clamped in a vice. This method allows more leeway in clamping the octagonal outline 48 because the top of the fork cap can be below the top of the vice and the socket (if long enough) can still get full purchase along almost the entire height of the fork cartridge ridge 52, but the problem with this method is that the elongated hexagonal shape of the ridge 52 only allows the socket wrench to engage two of the points in the socket with very limited contact area and does not provide a very secure grip on the fork cartridge ridge 52 (a hex socket normally engages six flats on a hex head thus providing many more times the contact area). If the tool slips as torque is applied, this could easily result in damage to the fork cartridge, which once damaged cannot be repaired. The manufacturer does not offer replacement fork caps or cartridges separately and requires that the entire assembly be purchased together at a cost of several hundred dollars.

The present cartridge driver 100 is able to grip the ridge 52 along almost its full height and thus has a much more secure grip and is less likely to damage the fork cartridge and is much easier to operate because there is less opportunity for it to slip off.

Thus, the present invention 100 offers a substantial improvement because it provides a much better and secure grip on the parts that are being disassembled and reassembled and thereby greatly reduces the likelihood of damage to those parts, which are very expensive to replace.

In a second embodiment, the inner driver 204 is configured much like the first embodiment 100 discussed earlier, and functions in a similar manner. One significant difference is that the ends of the slot 132 have been enclosed to make an enclosed slot 232. Also, the lower portion depth 222 of the outer ring 202 has been increased, and the thickness 254 of the plate 150 of the inner driver 204 has been decreased to provide better grip on the fork cap.

This second embodiment 200 functions almost identically with the first embodiment 100, and is one of many possible examples of how variations can be made in the present invention while still falling within the scope of the invention.

Presently fork cartridges are being manufactured with a variety of engagement features which the inner driver of the fork cartridge tool must engage. In the first two embodiments, this engagement feature 54 was a protruding ridge 52 for which the engagement feature mate 133 of the inner driver 104 was configured as a slot 132 in the first embodiment or as an enclosed slot 232 in the second embodiment. There are a variety of other possible engagement features for fork cartridges on the market now which include other configurations of protruding male features, but also may include intruding female features such as variously configured holes. In the third embodiment, inner driver 304 includes a raised male portion 303, which is configured as an octagonal protrusion 305, which thus mates with a corresponding female octagonal recess in the fork cartridge. In a similar way to the operation conducted by the first and second embodiments, the third embodiment mates with the engagement feature of the fork cartridge, and when a turning tool is engaged with the insertion hole 336 and turned, the inner driver 304, and also the fork cartridge turn relative to the fork cap, which is held in place by the outer ring as before.

Other configurations of engagement features are known which include a series of holes in the top of the fork cartridge in a square pattern, which are mirrored by a square pattern of mating pins in the inner driver.

There are of course a great variety of possible engagement features that can be configured, and it seems to be a trend that manufacturers favor their own unique configuration, rather than a standardized configuration. However, a great variety in configurations in the inner driver mating portion is expected, and all are contemplated as being within the course and scope of the present invention.

For the above, and other, reasons, it is expected that the fork cartridge driver 100 of the present invention will have widespread industrial applicability. Therefore, it is expected that the commercial utility of the present invention will be extensive and long lasting.

The invention claimed is:

1. A fork cartridge driver, comprising:
an outer ring which includes a larger lower bore with an octagonal internal outline and a smaller upper bore which has a cylindrical internal outline; and
inner driver which is reversible to engage both a fork cap and a fork cartridge.

2. The fork cartridge driver of claim 1, wherein:
said inner driver includes an upper portion having a cylindrical outline, and ridges which define a slot between said ridges, a lower portion having an octagonal outline, and an insertion hole.

3. The fork cartridge driver of claim 2, wherein:
said fork cartridge driver is configured as an upright position assembly, wherein said inner driver is placed in upright position, and is inserted into said outer ring so that said octagonal outline of said lower portion of said inner driver engages said octagonal internal outline of said lower bore of said outer ring, and said cylindrical outline of said upper portion of said inner driver engages said cylindrical outline of said upper bore of said outer ring.

4. The fork cartridge driver of claim 3, which is configured to remove a fork cartridge assembly from a fork tube, where said fork cap of said fork cartridge assembly has an octagonal outline and a ridge, wherein:
said fork cartridge driver is configured as an upright position assembly, which is placed to engage said fork cartridge assembly such that said internal octagonal outline of said larger lower bore of said outer ring engages said octagonal outline of said fork cartridge assembly, and a turning tool is inserted into said insertion hole in said inner driver such that when said turning tool is rotated, said inner driver also is rotated, which also rotates said outer ring, which also rotates said fork cartridge assembly, unscrewing it from a fork.

5. The fork cartridge driver of claim 3, wherein:
said lower portion of said inner driver having an octagonal outline is configured as a plate having a plate thickness; and
said internal octagonal bore of said outer ring has a depth dimension which is greater than the plate thickness of said plate of said inner driver.

6. The fork cartridge driver of claim 2, which is configured to remove a fork cap from a fork cartridge, said fork cap having an engagement feature configured as a ridge, wherein:
said fork cartridge driver is configured as an inverted position assembly, wherein said inner drive is in inverted position, and is inserted into said outer ring so that said cylindrical outline of said smaller upper portion of said inner driver engages said cylindrical outline of said smaller upper bore of said outer ring.

7. The fork cartridge driver of claim 6, wherein:
said inverted position assembly is placed so that said slot of said inner driver engages said ridge of said fork cartridge and where said fork cap of said fork cartridge assembly has an octagonal outline which is engaged by said internal octagonal outline of said lower bore of said outer driver, and a turning tool is inserted into said insertion hole in said inner driver such that when said turning tool is rotated, said inner driver is rotated, which rotates said fork cartridge with respect to said fork cap.

8. The fork cartridge driver of claim 2, wherein:
said slot of said inner driver is an enclosed slot.

9. The fork cartridge driver of claim 1, wherein:
said outer ring has a knurled outer surface.

10. A fork cartridge driver which is invertible to engage both a fork cap and a fork cartridge, comprising:
an outer ring which includes a lower bore with an octagonal internal outline and a upper bore which has a cylindrical internal outline; and
an inner driver which includes an upper portion having a cylindrical outline, said upper portion having an engagement feature mate, and an insertion hole, and said inner driver also includes a lower portion having an octagonal outline.

11. The fork cartridge driver of claim 10, wherein:
said lower portion of said inner driver having an octagonal outline is configured as a plate having a plate thickness; and
said internal octagonal bore of said outer ring has a depth dimension which is greater than the plate thickness of said plate of said inner driver.

12. The fork cartridge driver of claim 10, wherein:
said outer ring has a knurled outer surface.

13. The fork cartridge driver of claim 10, wherein:
said engagement feature mate of said inner driver is a slot.

14. The fork cartridge driver of claim 10, wherein:
said engagement feature mate of said inner driver is an enclosed slot.

15. A method for disassembling a fork cartridge assembly, which includes a fork cap having an octagonal outline portion and a fork cartridge having a ridge, the method comprising:
A) providing a fork cartridge driver having an outer ring having an internal octagonal bore portion and a cylindrical bore portion, and a reversible inner driver having a cylindrical upper portion, an octagonal lower portion, an engagement feature mate, and an insertion hole,
B) configuring said fork cartridge driver in an upright position assembly, wherein said inner driver is in upright position, and is inserted into said outer ring so that said octagonal outline of said larger lower portion of said reversible inner driver engages said octagonal internal outline of said larger lower bore of said outer ring, and said cylindrical outline of said smaller upper portion of said inner driver engages said cylindrical outline of said smaller upper bore of said outer ring;
C) placing said fork cartridge driver on said fork cartridge assembly such that said internal octagonal bore of said outer ring engages said octagonal outline portion of said fork cap;
D) inserting a turning tool into said insertion hole;
E) rotating said turning tool, so that when said turning tool is rotated, said inner driver is rotated, which also rotates said outer ring, which also rotates said fork cartridge assembly to unscrew it from said fork tube assembly;
F) reversing said reversible inner driver so that said fork cartridge driver is in an inverted position, where said inner driver is inverted and inserted into said outer ring so that said upper cylindrical portion of said inner driver engages said cylindrical portion of said outer ring, and said engagement feature mate of said inner driver engages a corresponding engagement feature on said fork cartridge;
G) inserting a turning tool into said insertion hole;
H) rotating said turning tool, so that when said turning tool is rotated, said inner driver is rotated, with respect to said outer ring, said fork cap is also rotated and thus unscrewed from said fork cartridge; and
I) removing said fork cap from said fork cartridge.

16. The fork cartridge driver of claim 15, wherein:
A) includes said outer ring having a larger lower bore with an octagonal internal outline; and
a smaller upper bore which is cylindrical in outline.

17. The fork cartridge driver of claim 16, wherein:
A) includes said inner driver having a smaller upper portion having a cylindrical outline, and said engagement feature mate includes ridges which define a slot between said ridges; and
a larger lower portion having an octagonal outline.

18. The fork cartridge driver of claim 16, wherein:
A) includes said inner driver having a smaller upper portion having a cylindrical outline, and said engagement feature mate includes a protruding portion which is octagonal in outline; and
a larger lower portion having an octagonal outline.

\* \* \* \* \*